O. L. REYNOLDS.
Sewing Machine.
No. 829. Reissued Sept. 27, 1859.
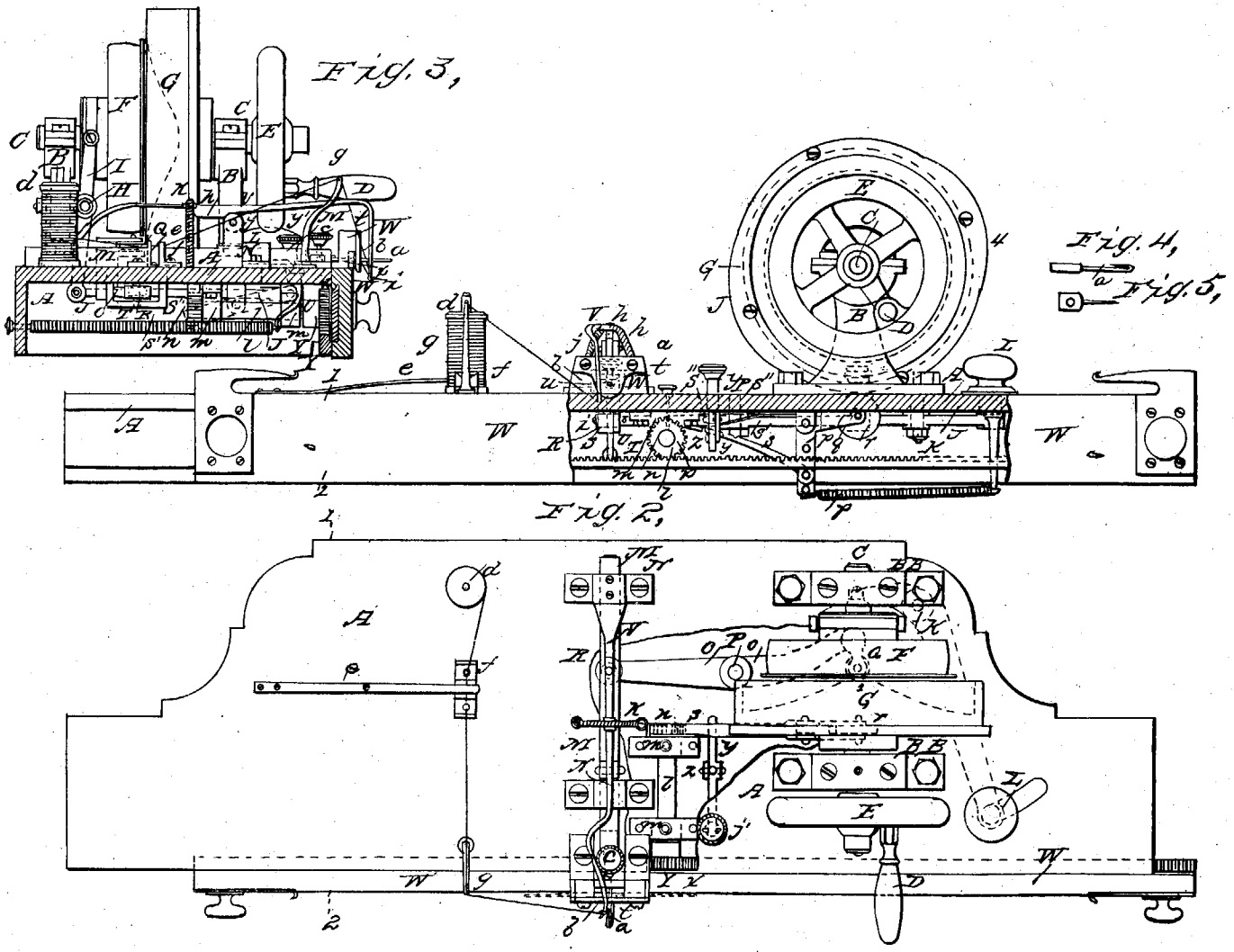
N. PETERS, Photo-Lithographer, Washington, D. C.

UNITED STATES PATENT OFFICE.

JOS. W. BARTLETT, OF NEW YORK, N. Y., ASSIGNEE OF O. L. REYNOLDS.

IMPROVEMENT IN SEWING-MACHINES.

Specification forming part of Letters Patent No. 7,369, dated May 14, 1850; Reissue No. 829, dated September 27, 1859.

*To all whom it may concern:*

Be it known that I, O. L. REYNOLDS, of Dover, in the county of Stratford and State of New Hampshire, have invented a new and useful Improvement in Sewing-Machines; and I do hereby declare the following to be a full, clear, and exact description thereof, reference being had to the accompanying drawings, figures, and letters of reference thereon, making part of this specification.

Of the said drawings, Figure 1 is a front elevation of the machine, having part of the cloth-feeder and part of the bed-plate broken away in order to show the working parts. Fig. 2 is plan view, having part of the bed-plate broken away. Fig. 3 is a vertical transverse section through the line 1 2 of Figs. 1 and 2. Fig. 4 is a bearded or hooked needle, which draws the thread through the cloth. Fig. 5 is a piercer for perforating the cloth.

Similar letters of reference indicate like parts in all the drawings.

My machine is designed as a single-thread sewing-machine.

The nature of the first part of my invention consists in the employment, in a sewing-machine, of a needle having a movable or flexible beard or hook, and also, in combination therewith, of a mechanism for closing the beard or hook to retain the thread therein and prevent the catching or tearing, the material being sewed during the receding movement of the needle, as will be more fully hereinafter set forth.

The nature of the second part of my invention consists in the employment, in combination with a bearded or hooked instrument for carrying thread in a sewing or tambouring machine, of a thread-guide having such motions as shall carry the thread across the path of the hooked instrument and present it to the action of the barb thereof without leaving it entirely around the shank of the instrument; and also in providing means for imparting the proper motions to said guide, as will hereinafter more fully appear.

To enable others skilled in the art to make and use my invention, I will proceed to describe its construction and operation.

A is the bed-plate.

B B are standards secured to the bed-plate, carrying the main shaft C, which is mounted in suitable bearings, and receives a rotary motion by means of a crank-handle, D, on the fly-wheel E or by a band working on the pulley F.

G is a cam fast on the main shaft C, and performs two offices, each of which it performs twice during its revolution—first, that of working the needle-piercer and thread-guide; and, second, that of working the feeding apparatus.

The pulley F is loose upon the shaft C, so as to allow of the stoppage or starting of the machine while being worked by a band motion, being transmitted by means of an ordinary clutch from the pulley F to the cam G.

H is a fixed center attached to the standard B, the lever I working on the center H, and is attached at its upper end (which is forked) to the boss of the pulley F, and at its lower end, which passes through a slot in the bed-plate to the end of another lever, J, under the bed-plate, working on a center, K, fast to the bed-plate. This lever J has at its opposite end a knob or handle attached to a stud passing through a slot in the bed-plate. By moving the handle to or fro the pulley F is released from or clutched firmly to the cam G.

*a* is the needle, of the hook or bearded form, such as is used in knitting-machines. (Seen in Fig. 4.)

*b* is the piercer, formed as shown in Fig. 5.

M is a bar sliding in the direction of its length on the face of the bed-plate, and working in guides N N, screwed to the bed-plate. The needle is provided with a shank, which is fitted into the end of the sliding bar M, which is bored to receive it, and secured by a set-screw, *c*. The piercer is secured by a screw to the sliding bar M at a distance from the needle equal to the intended length of stitch. It is shorter than the needle, so that it does not pierce the cloth in its forward motion until the needle has entered the hole made by the last forward motion of the piercer; otherwise it might in passing through the cloth close the last hole made.

O is a lever working under the bed-plate on a center, P, fast to the bed-plate. One end of this lever is provided with a fixed stud, which passes through a slot in the bed-plate and carries a friction-roller, *a*. The opposite end is formed into an eye, R.

S is a small frame attached to the under side of the sliding bar M, and working through a slot in the bed-plate of the machine. It carries a friction-roller, which works in the eye R.

T is a helical spring, attached by one end to the side of the bed-plate and by the other to a stud, U, on the lower side of the sliding bar M. This spring has a tendency to keep the sliding bar, and consequently the needle, in its most backward position.

On the back side of the cam G is a groove, against the bottom of which works the friction-roller *a*. The form of the groove is shown by dotted lines, and it will be seen that as its most prominent parts (marked 1 in Figs. 2 and 3) are in contact with the friction-roller *a*, the bar, with the needle and piercer, will be thrust forward to their full extent through the material, and, as the cam revolves, the spring T will draw back the bar, and with it the needle and piercer. When the cam has made one quarter of a revolution, one of the deepest parts 2 of the groove will be in contact with the friction-roller *a*, and the bar M, with the needle and piercer, will be drawn to their most backward position.

*d* is a spool revolving easily on a fixed spindle fast to the bed-plate.

*e* is a spring attached at one end to the bed-plate and having its other end pressed on the thread as it passes through the notches in the guide *f*, for keeping the proper tension on the thread, so as to make the stitches tight.

*g* is a fixed thread-guide.

V is the movable thread guide or leader, which is formed of spring steel, and is firmly attached at its back end to one of the guides N, near the center of its length. On its under side is a projection, *h*, and its front end is bent over the edge of the bed-plate, and is provided with an eye, *i*, through which the thread passes. A friction-roller, *j*, is mounted in a bearing attached to the upper side of the sliding bar M. Upon this roller the guide-arm V rests, and is held by a helical spring, *k*, which is bent over it and secured at both ends by screws to the bed-plate. When the needle is in its back position, the projection *h* is resting on the roller *j*, and the eye *i* is raised; but as the bar M moves forward the roller leaves the projection and the spring *k* draws down the guide-arm. W is the board which carries the material.

The material is attached at its upper edges to hooks formed of the ends of plates screwed to the board, while its lower edge is drawn over pins, also fixed in the board. The board is grooved on its back side to fit the V-shaped edge of a plate screwed to the front of the bed-plate, and on the lower edge of its back side carries a toothed rack, X. Into this rack a toothed wheel or pinion, G, is geared. This pinion is mounted on a shaft or spindle, *l*, mounted in bearings *m m*, screwed to the under side of the bed-plate. At the opposite end of the spindle *l* is a ratchet, *n*.

O is a fixed center or bearing.

*p* and *y* are two levers working on the common center *o*.

At the end of the lever *y* is a friction-roller, *r*. A click or pawl, *s*, is jointed to the lever *p* and gears into the ratchet-wheel *n*. As the cam G revolves, the projections 3 and 4 come alternately in contact with the friction-roller *r*, thereby depressing the lever *y* and forcing forward the end of the lever *p*, and the pawl, taking into the teeth of the ratchet-wheel, causes the spindle *l* to revolve the toothed wheel Y. Moving the rack forward gives the required movement to the cloth-carrier.

*s′* is a spring secured at one end under the bed-plate, and bearing on the pawl *s*, keeping it to the ratchet-wheel *n*.

*s″* is another spring, catching the teeth of the ratchet-wheel, to prevent its being drawn back by the pawl in its backward motion.

*p′* is a helical spring, fast to a stud in the bed-plate, for the purpose of bringing back the lever *p* and pawl *s*, so as to be ready again for action.

The feed may be regulated according to the length of stitch required by the distance which the pawl is jointed from the center *o*.

*y* is a lever working under the bed-plate on a center, *z*, fast to the bed-plate, and having at one end a stud, *y′*, passing through the plate. If this stud is pressed down, the opposite end of the lever will raise the pawl *s* from the ratchet-wheel *n* and allow the cloth-carriage to be moved by hand in either direction along the front of the machine.

*t* is a plate, against which the cloth is held while being pierced and sewed.

*u* is a small hole to allow the piercer to pass through.

*v* is another hole, through which the needle passes.

The plate *t* is screwed to a carriage, *w*, which is bolted to the bed-plate.

*x* is a plate forming part of the carriage *w*, against which the cloth is held by the backward stroke of the needle. This plate has holes corresponding to those in the plate *t*, to allow the passage of the needle and piercer. The red lines denote the thread, and the blue line the cloth held by the edges.

The operation of the machine is as follows: The material is stretched on the carriage W and the thread is brought from the spool *d* through the guides *f* and *g*, and is passed through the eye *i* at the end of the guide-arm V, the end of the thread being held by the operator. The cam G is caused to revolve till one of the most prominent parts in the groove (marked 1 on the dotted line in Figs. 2 and 3) is in contact with the friction-roller Q on the lever O, the guide-bar M will be propelled forward to its full extent, and the needle *a* and piercer *b* will be driven through the cloth. The roller *j* on the bar M will be removed from the projection *h* on the arm V, and the arm will have descended and the eye *i* will have guided the thread across the path of the needle; and as the cam proceeds farther in its revolution the needle will be drawn back through the cloth, carrying the thread therewith in the form of a loop, the point of the hook or beard of the needle being closed or pressed into a groove in the needle (made therefor) in its backward passage by passing through the hole *v* in the plate *t*, for the purpose of preventing the said beard or hook from catching and tearing the material or injuring the needle. When it has passed through, it is released and is left open. The projection 4 on the outside of the cam G will then act upon the roller *r* on the lever *y* and give the motion to the cloth-carriage, which will cause the loop in the thread to lie along the back of the cloth. The next prominent part, 1, of the cam G will come in contact with the roller Q and again force the needle forward through the hole formed by the piercer *b* in its last stroke, and the thread will again be led across the path of the needle as the eye *i* descends. As the cam continues revolving, the needle will recede, taking the thread again in the form of a loop through the cloth and through the last-formed loop. The projection 3 on the cam G will then act on the roller *r*, and the cloth will be ready for the needle to pass through again for the next stitch, the piercer at every forward stroke of the bar M making a hole in the cloth, through which the needle passes at the next forward stroke of the bar M. The end of the thread may be left by the operator after one or two stitches are made, as the action of the cloth-carriage will tighten the thread.

It would seem almost superfluous here to remark that the mode herein described for closing the beard of the flexible-bearded needle may be accomplished by various mechanical devices, and also that the movable thread-guide may admit of many changes of form and of construction and of modes of operation and yet remain within the spirit of my invention.

Having thus fully described my invention, I will state I am aware of the English patent of January 26, 1849, No. 12,221, wherein is described a thread-guide to loop the thread onto a hook-needle used with a shuttle, and I therefore disclaim, broadly, this device; but

What I claim as the invention of O. L. REYNOLDS, and desire to secure by Letters Patent, is—

1. The employment and use, in a sewing or tambouring machine, of a needle or thread carrier having a movable or flexible beard or hook, and also the combination, with said needle or thread carrier, of a mechanism for closing the beard thereof.

2. The combination, with a bearded instrument, used as before described, of the thread-guide V, having the motions described, such as shall carry the thread across the path of the bearded instrument and present it to the action thereof without carrying the thread around the shank of the said bearded instrument, in the manner set forth and described.

3. The combination of the cam G, lever O, and guide V with a spring, whereby the thread is presented to the action of the bearded instrument, as set forth.

J. W. BARTLETT. [L. S.]

Witnesses:
C. A. DURGIN,
J. B. FROST.